United States Patent Office 2,812,281
Patented Nov. 5, 1957

2,812,281

POLYCHLORO-DIPHENYLSULFONES AND THE USE OF SUCH COMPOUNDS FOR COMBATTING THE STAGES IN THE DEVELOPMENT OF MITES

Jacques Meltzer and Henderikus Obias Huisman, Weesp, Netherlands, assignors, by mesne assignments, to North American Philips Company, Inc., New York, N. Y., a corporation of Delaware No Drawing. Application November 15, 1954, Serial No. 469,058

Claims priority, application Netherlands November 14, 1953

12 Claims. (Cl. 167—30)

In order to protect textile fabrics from attack by moths it has been proposed to treat such fabrics with compounds of the general formula

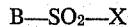

wherein B and X may stand inter alia for halogen substituted benzens radicals, for example 4,4'-dichloro-diphenylsulphone, 3,4-dichloro-diphenylsulphone, 3,4,4'-trichloro-diphenylsulphone, 2,4,4'-trichloro-diphenylsulphone, 2,3',4,4'-tetrachlorodiphenylsulphone.

As means for combating non-keratine eating noxios insects living in houses or on plants, or the stages of development of such insects with the exception of caterpillars of moths, compounds have been proposed of the general formula

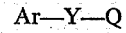

wherein Ar stands for a benzene radical having at any rate a substituent in para-position, which does not give rise to the formation of salt and does not contain carbon, Q represents an organic radical and Y stands for sulphur or a sulphur-containing group, Ar and Q being directly combined with sulphur. As such it has been proposed to use 3,4,4' - trichlorodiphenylsulphone, 2,4,4' - trichlorodiphenylsulphone, 3,4,5,4'-tetrachlorodiphenylsulphone, 4,4'-dichlorodiphenylsulphone and furthermore 2,4,5-trichlorophenylsulphonamide acylated to nitrogen.

Furthermore it has been published that diphenylsulphone kills the eggs of spint. Although para-chlorodiphenylsulphone also is argued to have this effect, this would not hold for 4,4'-dichlorodiphenylsulphone.

The present invention relates to polyhalogen diphenylsulphones which are very suitable for combating stages of development of mites.

The invention has for its object to provide a method of producing polyhalogen-substituted diphenylsulphones and has the feature that compounds are prepared of the general formula

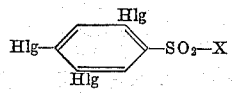

wherein Hlg stands for a halogen atom and X for a phenyl-group where halogen may be substituted for hydrogen in the position 4 or in the positions 2, 4 and 5 (in combination). Preferably the chloro-compounds are produced.

Production of the compounds in accordance with the invention may be effected in a manner known per se, for example by sulphonating 1,2,4-trihalogenbenzene with chlorosulphonic acid and coupling, under the action of a condensation agent e. g. aluminum chloride, zinc chloride, boriumtrifluoride, stannic chloride, the tri-halogen benzene sulphochloride to benzene or mono-halogenbenzene or 1,3,4-trihalogenbenzene.

Tests have shown that the eggs and nymphs of mites are killed by compounds of the said formula, more particularly the chloro-compounds, and that the reproducing power of images is reduced.

The conditions under which the tests were carried out will be referred to later.

The invention furthermore comprises a method of producing means for combating the stages of development of mites, notably spint. In accordance with this method, compounds of the said general formula, more particularly the chloro-compounds, are diluted with a powder, for example talc powder, magnesia, marlstone, kaolin, or incorporated in a solvent such as, for example, xylene, toluene. The compounds are preferably suspended or emulsified—or as such either dissolved in a non-water-miscible liquid or mixed with a non-water-soluble powder—in water.

In order to investigate the activity of the compounds the following tests were carried out:

A leaf of a dwarf French bean (Phasaeolus) with three day old eggs of spint (Tetranychus urticae Koch) was well wetted by immersion in an emulsion of a polyhalogen-diphenylsulphone in water. The tests were carried out with three polychloro-diphenylsulphones (column 1 of the table below) and at different concentrations of the diphenylsulphones in water (column 2). The percentage of the number of eggs not hatched out after four days (column 3) and the percentage of the nymphs killed four days after coming out were determined (column 4).

| Compound | Concentr., mg/l. | Percent killed eggs | Percent killed nymphs | Percent total kill |
|---|---|---|---|---|
| 2,4,5,2',4',5'-hexachloro-diphenylsulphone | 1,000 | 57 | | 57 |
| 2,4,5,4'-tetrachloro-diphenysulphone | 100 | 100 | | 100 |
|  | 30 | 100 | | 100 |
|  | 10 | 67 | 100 | 100 |
| 2,4,5-trichloro-diphenysulphone | 500 | 100 | | 100 |
|  | 250 | 99 | 100 | 100 |
|  | 100 | 69 | 100 | 100 |
|  | 30 | 57 | 61 | 84 |

The aforesaid tests furthermore revealed that the compound 2,4,5,4'-tetra-chlorodiphenylsulphone is not injurious to foliage and only slightly toxic. As tests objects use was inter alia made of the leaves of cucumber (Cucurbita) and dwarf French beans (Phasaeolus). The toxicity was found to be low, since on administering 1100 mg. of the said substance per kg. living mice the toxidic critical dosage was not yet reached.

In order that the invention may be readily carried into effect it will now be described by giving examples of producing 2,4,5-trichlorobenzenesulphone and 2,4,5,4'-tetrachlorodiphenylsulphone.

*Example 1*

Chlorosulphonic acid (19 mols) was added dropwise at 90° C. while stirring to dry 1,2,4-trichlorobenzene (2.76 mols) and the reaction mixture was heated for approximately three hours on a steam bath. After cooling, the reaction mixture was poured out into ice and the crude 2,4,5-trichlorobenzene sulphochloride was recrystallized from petroleum ether (boiling point range 40 to 60° C.). The cleaned substance melted between 65 and 67° C.

0.23 mol of the compound thus produced was dissolved in 0.28 mol water and thiophene-free benzene and aluminum chloride (0.23 mol) was added to the solution at room temperature while stirring. The reaction mixture was warmed for approximately 1½ hours on an oil bath of 80° C. to 90° C. and the mixture was poured into ice water. The deposit was cleaned by dissolving it in ethylacetate and causing it to deposit by adding petroleum ether. The resulting 2,4,5-trichlorodiphenylsulphone had a melting range of 127° C. to 129° C.

*Example II*

Waterfree aluminiumchloride (0.21 mol) was added to a solution of 2,4,5-trichlorobenzenesulphochloride (0.2 mol) prepared similarly to Example I in chlorobenzene (0.22 mol) whilst stirring and shutting out moisture at a bath temperature of approximately 60° C., the reaction mixture subsequently being heated for approximately three hours at 90° C. and poured into ice water. The deposit was recrystallized from ethanol, thus obtaining 2,4,5,4'-tetrachlorodiphenylsulphone, melting range of 146° C. to 148° C.

What is claimed is:

1. A compound corresponding to the formula:

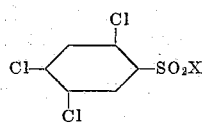

wherein Cl is a chlorine radical and X is a radical selected from the group consisting of phenyl, 4-chlorophenyl and 2,4,5-trichlorophenyl radicals.

2. 2,4,5-trichlorophenyl-phenyl sulfone.
3. 2,4,5,4'-tetrachloro-diphenylsulphone.
4. 2,4,5,2',4',5'-hexachlorodiphenylsulphone.
5. A method of destroying mites comprising distributing a composition comprising a compound corresponding to the formula

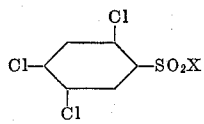

wherein Cl is a chlorine radical and X is a radical selected from the group consisting of phenyl, 4-chlorophenyl and 2,4,5-trichlorophenyl radicals and an inert carrier therefor to bring said composition into contact with said mites.

6. A method of destroying mites comprising distributing a composition comprising 2,4,5,4'-tetrachlorodiphenylsulfone and an inert carrier therefor to bring said composition into contact with said mites.

7. A method of destroying mites comprising distributing a composition comprising a compound corresponding to the formula

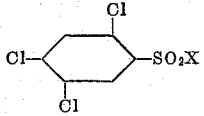

wherein Cl is a chlorine radical and X is a radical selected from the group consisting of phenyl, 4-chlorophenyl and 2,4,5-trichlorophenyl radicals and an inert solid carrier therefor to bring said composition into contact with said mites.

8. A method of destroying mites comprising distributing a composition comprising 2,4,5,4'-tetrachlorodiphenylsulfone and an inert solid carrier therefor to bring said composition into contact with said mites.

9. A method of destroying mites comprising distributing a composition comprising a compound corresponding to the formula

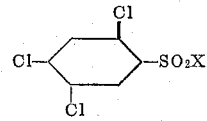

wherein Cl is a chlorine radical and X is a radical selected from the group consisting of phenyl, 4-chlorophenyl and 2,4,5-trichlorophenyl radicals and an inert liquid carrier therefor to bring said composition into contact with said mites.

10. A method of destroying mites comprising distributing a composition comprising 2,4,5,4'-tetrachlorodiphenylsulfone and an inert liquid carrier therefor to bring said composition into contact with said mites.

11. An acaracidal composition containing as an active acaracidal ingredient a compound corresponding to the formula:

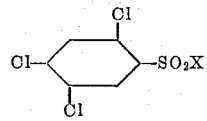

wherein Cl is a chlorine radical and X is a radical selected from the group consisting of phenyl, 4-chlorophenyl and 2,4,5-trichlorophenyl radicals and an inert carrier therefor.

12. An acaracidal composition containing as an active acaracidal ingredient 2,4,5,4'-tetrachlorodiphenylsulfone and an inert carrier therefor.

References Cited in the file of this patent

UNITED STATES PATENTS

| | | |
|---|---|---|
| 1,763,556 | Herz et al. | June 10, 1930 |
| 2,185,654 | Peski et al. | Jan. 2, 1940 |
| 2,224,964 | Huisman | Dec. 17, 1940 |
| 2,664,443 | Horst et al. | Dec. 29, 1953 |

OTHER REFERENCES

Huntress et al.: J. Am. Chem. Soc., 62, 511–514 (1940).

King Chemicals Evaluated as Insecticides and Repellents at Orlando, Fla., U. S. Dept. of Agriculture. Agriculture Handbook No. 69. Call No. SB 951 K55, page 320 Orlando No. 1386.

Frear; A Catalogue of Insecticides and Fungicides, vol. 1, page 58 (1946), published by the Chronica Botanica Co., Waltham, Mass. Call No. SB 951 F68.